(12) United States Patent
Ayub et al.

(10) Patent No.: US 10,241,790 B2
(45) Date of Patent: *Mar. 26, 2019

(54) OPERATION OF A MULTI-SLICE PROCESSOR WITH REDUCED FLUSH AND RESTORE LATENCY

(71) Applicant: International Business Machines Corporation, Armonk, NY (US)

(72) Inventors: Salma Ayub, Austin, TX (US); Brian D. Barrick, Pflugerville, TX (US); Joshua W. Bowman, Austin, TX (US); Sundeep Chadha, Austin, TX (US); Cliff Kucharski, Austin, TX (US); Dung Q. Nguyen, Austin, TX (US); David R. Terry, Austin, TX (US); Jing Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 263 days.

This patent is subject to a terminal disclaimer.

(21) Appl. No.: 14/969,436

(22) Filed: Dec. 15, 2015

(65) Prior Publication Data
US 2017/0168826 A1 Jun. 15, 2017

(51) Int. Cl.
*G06F 9/30* (2018.01)
*G06F 9/38* (2018.01)

(52) U.S. Cl.
CPC ........ *G06F 9/3012* (2013.01); *G06F 9/30043* (2013.01); *G06F 9/3836* (2013.01); *G06F 9/3861* (2013.01); *G06F 9/3891* (2013.01)

(58) Field of Classification Search
CPC .. G06F 9/3863; G06F 9/30098; G06F 9/3861; G06F 9/3826; G06F 9/384

USPC ......................................... 712/271, 218, 228
See application file for complete search history.

(56) References Cited

U.S. PATENT DOCUMENTS

| | | | | | |
|---|---|---|---|---|---|
| 5,913,048 | A | * | 6/1999 | Cheong | G06F 9/3836 712/215 |
| 6,112,019 | A | * | 8/2000 | Chamdani | G06F 9/3836 712/214 |
| 6,119,150 | A | * | 9/2000 | Fujii | G06F 12/0813 709/213 |

(Continued)

OTHER PUBLICATIONS

Smith, James E., and Andrew R. Pleszkun. "Implementing precise interrupts in pipelined processors." IEEE Transactions on computers 37.5 (1988): 562-573.*

(Continued)

*Primary Examiner* — Benjamin P Geib
*Assistant Examiner* — Aaron B. Pederson
(74) *Attorney, Agent, or Firm* — Nathan M. Rau

(57) ABSTRACT

Operation of a multi-slice processor that includes execution slices and load/store slices coupled via a results bus, including: for a target instruction targeting a logical register, determining whether an entry in a general purpose register representing the logical register is pending a flush; if the entry in the general purpose register representing the logical register is pending a flush: cancelling the flush in the entry of the general purpose register; storing the target instruction in the entry of the general purpose register representing the logical register, and if an entry in a history buffer targeting the logical register is pending a restore, cancelling the restore for the entry of the history buffer.

12 Claims, 4 Drawing Sheets

(56) References Cited

U.S. PATENT DOCUMENTS

| | | | |
|---|---|---|---|
| 6,308,260 B1* | 10/2001 | Le | G06F 9/3836 |
| | | | 712/215 |
| 6,442,677 B1* | 8/2002 | Meyer | G06F 9/30043 |
| | | | 712/216 |
| 6,587,941 B1* | 7/2003 | Flacks | G06F 9/3836 |
| | | | 712/218 |
| 7,243,262 B2 | 7/2007 | Mukherjee et al. | |
| 7,284,092 B2 | 10/2007 | Nunamaker et al. | |
| 8,725,993 B2 | 5/2014 | Abernathy et al. | |
| 9,152,510 B2 | 10/2015 | Busaba et al. | |
| 2008/0189535 A1* | 8/2008 | Agarwal | G06F 9/3842 |
| | | | 712/245 |
| 2008/0195850 A1* | 8/2008 | Abernathy | G06F 9/3802 |
| | | | 712/240 |
| 2010/0169622 A1* | 7/2010 | Nguyen | G06F 9/3863 |
| | | | 712/228 |
| 2010/0241899 A1* | 9/2010 | Mayer | G06F 11/0772 |
| | | | 714/10 |
| 2010/0312993 A1* | 12/2010 | I | G06F 9/384 |
| | | | 712/217 |
| 2011/0296148 A1 | 12/2011 | Cain, III et al. | |
| 2012/0066483 A1* | 3/2012 | Boury | G06F 12/0875 |
| | | | 712/233 |
| 2015/0032998 A1 | 1/2015 | Rajwar et al. | |

OTHER PUBLICATIONS

IBM. "Debug Dispatch, NTC, NTCP1 flushes by thread", An IP.com Prior Art Database Technical Disclosure, Original Publication Date: May 19, 2003, 3 pages, ip.com (online), IP.com No. IPCOM000012661D.

Ravotto, D., et al., "Design Validation of Multithreaded Processors Using Threads Evolution", Journal of Integrated Circuits and Systems, v.5 / n. 1, dated 2010, 11 pages, Politecnico di Torino, Itlay.

Appendix P; List of IBM Patent or Applications Treated as Related, Feb. 24, 2016, 2 pages.

* cited by examiner

OPERATION OF A MULTI-SLICE PROCESSOR WITH REDUCED FLUSH AND RESTORE LATENCY

BACKGROUND OF THE INVENTION

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY OF THE INVENTION

Methods and apparatus for operation of a multi-slice processor are disclosed in this specification. Such a multi-slice processor includes a plurality of execution slices and a plurality of load/store slices, where the load/store slices are coupled to the execution slices via a results bus. Operation of such a multi-slice processor includes: for a target instruction targeting a logical register, determining whether an entry in a general purpose register representing the logical register is pending a flush; if the entry in the general purpose register representing the logical register is pending a flush: cancelling the flush in the entry of the general purpose register; storing the target instruction in the entry of the general purpose register representing the logical register, and if an entry in the history buffer targeting the logical register is pending a restore, cancelling the restore for the entry of the history buffer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
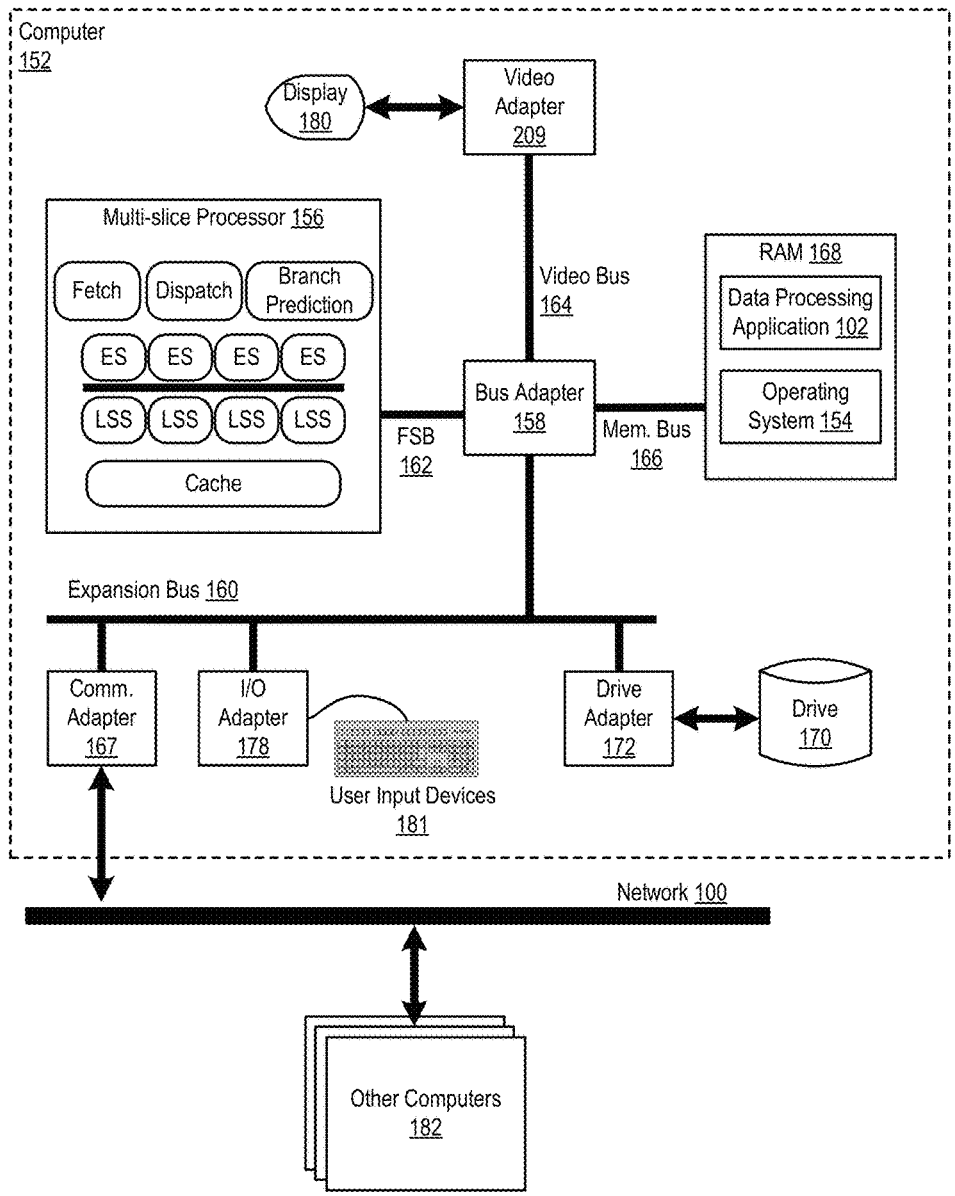
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
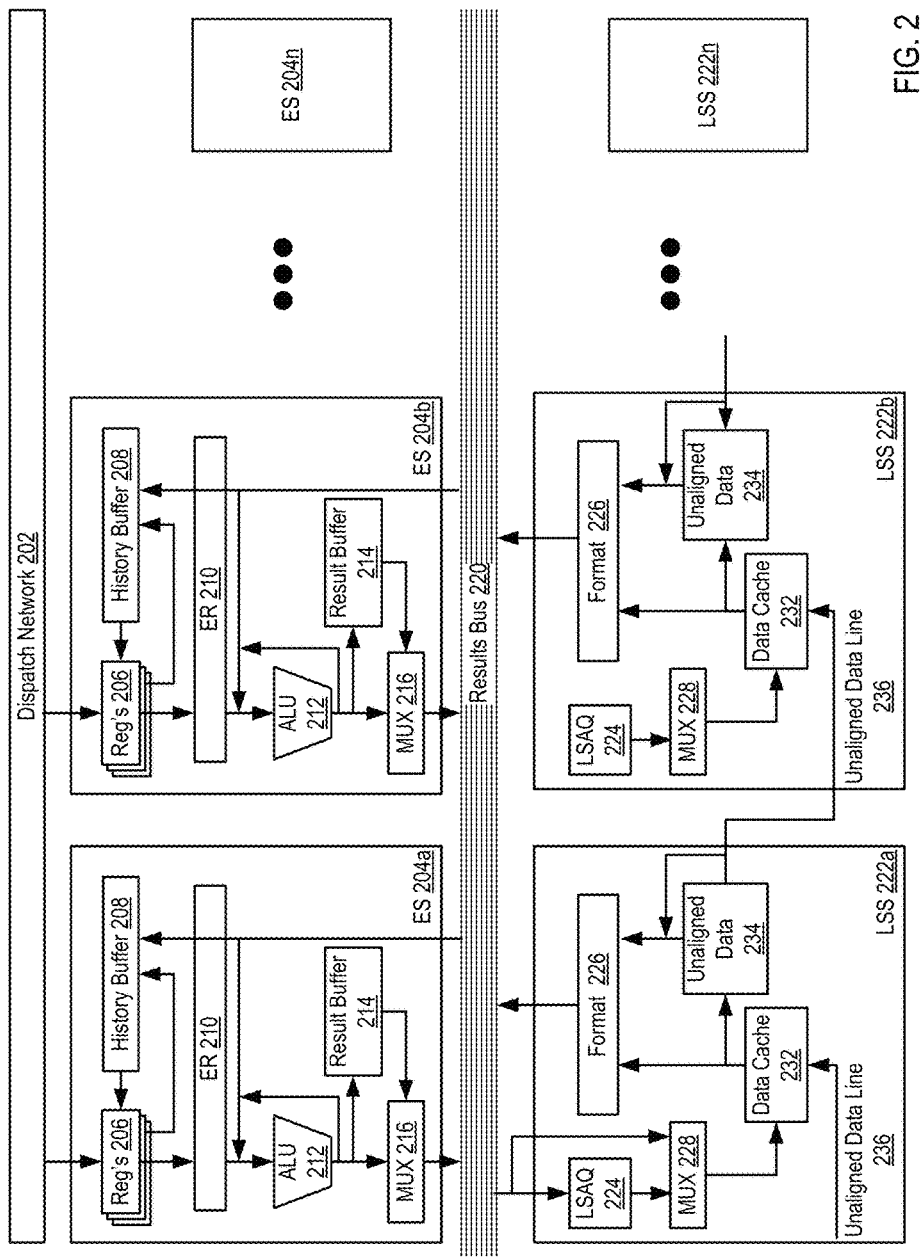
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a, 222b, 222c) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
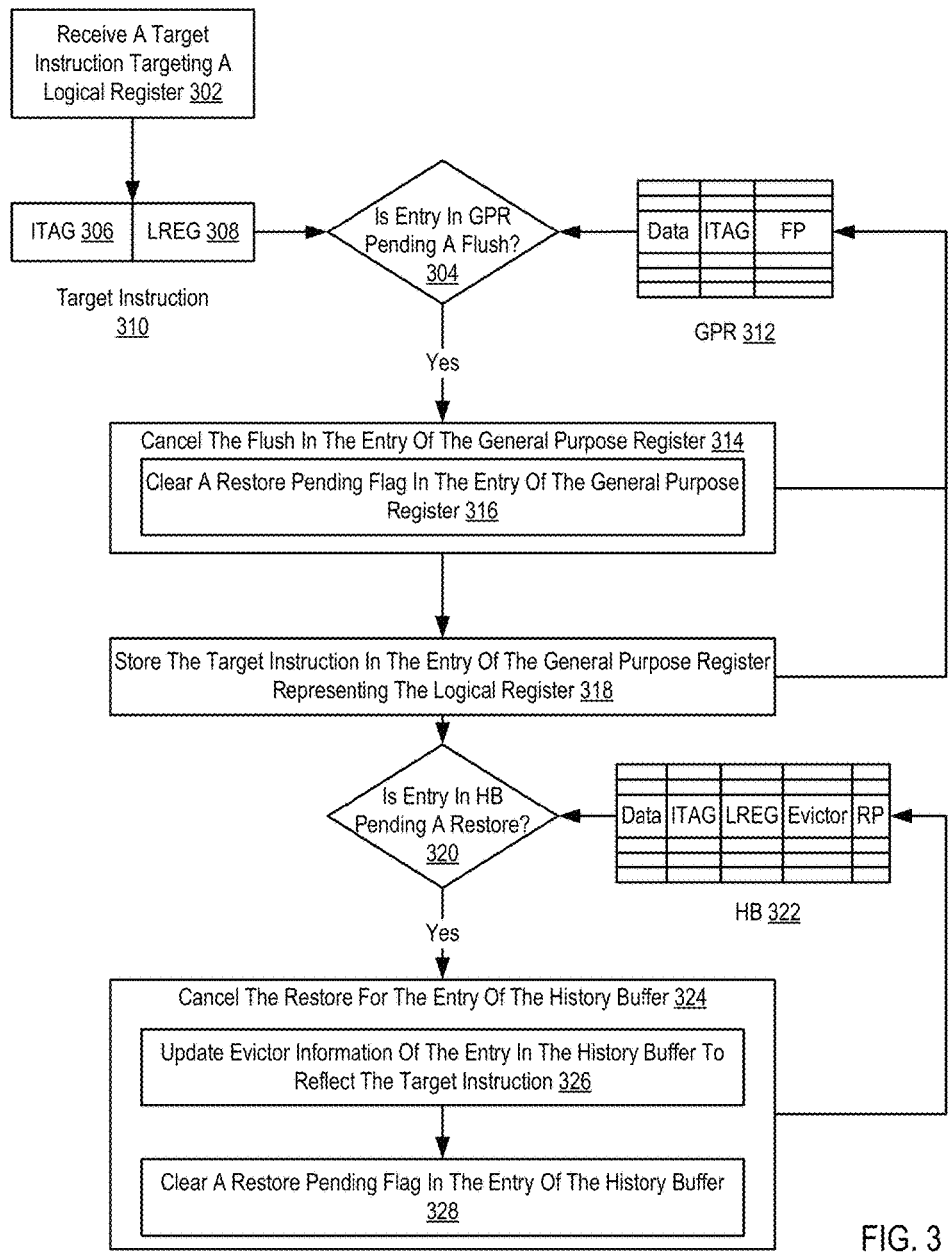
FIG. 3 sets forth a flow chart illustrating an exemplary method of operation of a multi-slice processor in which an execution slice receives a target instruction during a flush and recovery operation.

For further explanation, FIG. 3 sets forth a flow chart illustrating an exemplary method of operation of a multi-slice processor in which an execution slice receives a target instruction during a flush and recovery operation. The steps depicted in the method of FIG. 3 may be carried out by a multi-slice processor similar to that in the example of FIG. 2. Such a multi-slice processor may include a plurality of execution slices and a plurality of load/store slices, where the load/store slices are coupled to the execution slices via a results bus.

A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

Rather than holding the dispatcher from dispatching future instructions, the method of FIG. 3 sets forth an example of a multi-slice processor in which the dispatcher may continue to dispatch new instructions during a flush and recovery operation. To that end, the method of FIG. 3 includes receiving (302) by an execution slice a target instruction (310) targeting a logical register (308). The target instruction in the example of FIG. 3 includes an instruction identifier (306), referred to as an 'ITAG.'

The method of FIG. 3 also includes determining (304) whether an entry in a general purpose register (312) representing the logical register is pending a flush. Determining whether an entry in the general purpose register (312) is pending a flush may be carried out by utilizing the logical register (308) of the producer instruction as an index into the general purpose register (312) and determining whether a 'flush pending' or 'FP' flag is set.

If the entry in the general purpose register (312) representing the logical register (308) is pending a flush, the method of FIG. 3 continues by cancelling (314) the flush in the entry of the general purpose register and storing (318) the target instruction (310) in the entry of the general purpose register representing the logical register. In the method of FIG. 3, cancelling (314) the flush in the entry of the general purpose register is carried out by clearing (316) the flush pending flag (FP) in the entry of the general purpose register. Storing (318) a target instruction in an entry of a general purpose register may be carried out by storing the instruction parameters in the entry, such as the ITAG of the instruction.

The method of FIG. 3 also includes determining (320) whether an entry in a history buffer (322) targeting the logical register is pending a restore. Determining (320) whether an entry in a history buffer (322) targeting the logical register is pending a restore may be comparing each entry to the logical register of the target instruction and, for each entry including the same logical register, determining whether a restore pending ('RP') flag is set.

If an entry in the history buffer targeting the logical register is pending a restore, the method of FIG. 3 continues by cancelling (324) the restore for the entry of the history buffer. In the method of FIG. 3, cancelling (324) the restore for the entry of the history buffer is carried out by updating (326) evictor information ('Evictor') of the entry in the history buffer (322) to reflect the target instruction and clearing (328) the restore pending flag ('RP') in the entry of the history buffer.

Figure 4:
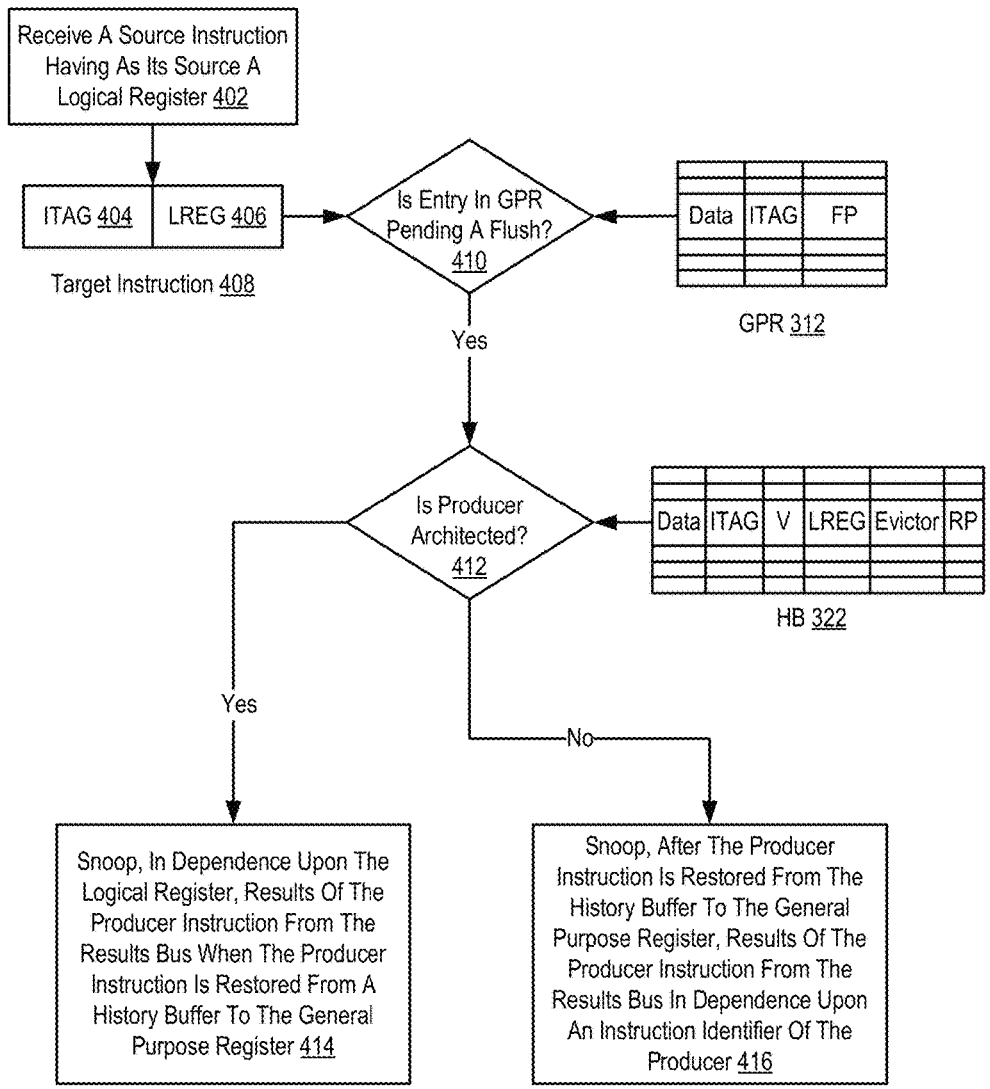
FIG. 4 sets forth a flow chart illustrating an exemplary method for operating a multi-slice processor in which an execution slice receives a source instruction during a flush and recovery operation.

For further explanation, FIG. 4 sets forth a flow chart illustrating an exemplary method for operating a multi-slice processor in which an execution slice receives a source instruction during a flush and recovery operation. The steps depicted in the method of FIG. 4 may be carried out by a multi-slice processor similar to that in the example of FIG. 2. Such a multi-slice processor may include a plurality of execution slices and a plurality of load/store slices, where the load/store slices are coupled to the execution slices via a results bus. The method of FIG. 4 may be a continuation of the method of FIG. 3, may occur prior to the steps depicted in the method of FIG. 3, or be carried out independent of the method of FIG. 3.

The method of FIG. 4 includes receiving (402) a source instruction (408) having, as its source, a logical register (406) in the general purpose register. Receiving a source instruction may be carried out by receiving a logical register and the ITAG (404) of the source instruction in an issue queue. In prior art processors, the issue queue utilizes the instruction parameters of the source instruction to identify the ITAG of the producer instruction from the register files. Then, the ITAG of the producer instruction may be utilized to snoop results of the producer instruction from the results bus. However, utilizing such parameters during a flush and recovery operation, without modification, may retrieve data results from a producer instruction that is in process of being flushed.

To that end, the method of FIG. 4 includes determining (410) whether an entry in the general purpose register representing the logical register of the source instruction is pending a flush. If the entry in the general purpose register is pending a flush, any data stored in that register entry cannot be utilized by the source instruction. Determining whether an entry in the general purpose register representing the source logical register of the source instruction is pending a flush may be carried out by determining whether a flush pending or restore pending flag is set in the entry of the general purpose register representing the logical register of the source instruction.

When an instruction is restored from a history buffer to the general purpose register, the history buffer presents the entry on the results bus and the general purpose register copies the entry from the results bus into the entry representing the logical register. The issue queue may also be configured to snoop the same entry information on the results bus during the restore of the history buffer to the general purpose register. The results data in the entry of the history buffer, at the time of restoration to the general purpose register, may be architected or the instruction may be in flight. If the instruction is in flight, the data in the entry cannot be utilized as a source for the source instruction.

To that end, the issue queue in the example of FIG. 4 may determine (412) whether the producer instruction is architected. Such a determination may be carried out by discovering results on a result bus and determining whether a valid bit ('V') is set. If the valid bit is set, the producer instruction is in flight. If the valid bit is clear, the producer instruction is architected and the data may be retrieved. If the producer instruction has been architected, the method of FIG. 4 continues by snooping (414), in dependence upon the logical register, results of the producer instruction from the results bus when the producer instruction is restored from the history buffer to the general purpose register. That is, rather than utilizing the producer's ITAG retrieved from the general purpose register to snoop architected data from the results bus, the issue queue may utilize the logical register of the source to match the logical register of the producer instruction as presented on the bus during recovery of the history buffer entry.

If the entry in the general purpose register representing the logical register is pending a flush and if the producer instruction has not been architected, the method of FIG. 4 continues by snooping (416) results of the producer instruction from the results bus in dependence upon an instruction identifier of the producer. Such snooping will effectively ignore the restoration of the entry from the history buffer to the general purpose register and only snoop the actual result of the producer instruction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A multi-slice processor comprising:
    a plurality of execution slices, each execution slice comprising an issue queue, one or more general purpose registers, a history buffer, and a plurality of execution units including one or more floating point units and one or more vector/scalar units; and
    a plurality of load/store slices, wherein the load/store slices are coupled to the execution slices via a results bus and the multi-slice processor is configured to carry out the steps of:
    for a target instruction targeting a logical register, determining whether an entry in a general purpose register representing the logical register is pending a flush; and
    when the entry in the general purpose register representing the logical register is pending a flush:
    cancelling the flush for the entry of the general purpose register;
    storing the target instruction in the entry of the general purpose register representing the logical register, and
    when an entry in a history buffer targeting the logical register is pending a restore, cancelling the restore for the entry of the history buffer.

2. The multi-slice processor of claim 1, further configured to carry out the steps of:
    for a source instruction having as its source a logical register targeted by a producer instruction, determining whether an entry in the general purpose register representing the logical register is pending a flush; and
    if the entry in the general purpose register representing the logical register is pending a flush and if the producer instruction has been architected, snooping, in dependence upon the logical register, results of the producer instruction from the results bus when the producer instruction is restored from the history buffer to the general purpose register.

3. The multi-slice processor of claim 2, further configured to carry out the steps of:
    if the entry in the general purpose register representing the logical register is pending a flush and if the producer instruction has not been architected, snooping, after the producer instruction is restored from the history buffer to the general purpose register, results of the producer instruction from the results bus in dependence upon an instruction identifier of the producer.

4. The multi-slice processor of claim 1, wherein cancelling the restore for the entry of the history buffer further comprises updating evictor information of the entry in the history buffer to reflect the target instruction.

5. The multi-slice processor of claim 1, wherein cancelling the restore for the entry of the history buffer further comprises clearing a restore pending flag in the entry of the history buffer.

6. The multi-slice processor of claim 1, wherein cancelling the flush for the entry of the general purpose register further comprises clearing a flush pending flag in the entry of the general purpose register.

7. An apparatus comprising:
   a multi-slice processor that includes a plurality of execution slices and a plurality of load/store slices, wherein the load/store slices are coupled to the execution slices via a results bus, wherein each execution slice comprises an issue queue, one or more general purpose registers, a history buffer, and a plurality of execution units including one or more floating point units and one or more vector scalar units; and
   a computer memory operatively coupled to the multi-slice processor, wherein the multi-slice processor is configured to carry out the steps of:
   for a target instruction targeting a logical register, determining whether an entry in a general purpose register representing the logical register is pending a flush; and
   when the entry in the general purpose register representing the logical register is pending a flush:
   cancelling the flush for the entry of the general purpose register;
   storing the target instruction in the entry of the general purpose register representing the logical register, and
   when an entry in a history buffer targeting the logical register is pending a restore, cancelling the restore for the entry of the history buffer.

8. The apparatus of claim 7, wherein the multi-slice processor is further configured to carry out the steps of:
   for a source instruction having as its source a logical register targeted by a producer instruction, determining whether an entry in the general purpose register representing the logical register is pending a flush; and
   if the entry in the general purpose register representing the logical register is pending a flush and if the producer instruction has been architected, snooping, in dependence upon the logical register, results of the producer instruction from the results bus when the producer instruction is restored from the history buffer to the general purpose register.

9. The apparatus of claim 8, wherein the multi-slice processor is further configured to carry out the steps of:
   if the entry in the general purpose register representing the logical register is pending a flush and if the producer instruction has not been architected, snooping, after the producer instruction is restored from the history buffer to the general purpose register, results of the producer instruction from the results bus in dependence upon an instruction identifier of the producer.

10. The apparatus of claim 7, wherein cancelling the restore for the entry of the history buffer further comprises updating evictor information of the entry in the history buffer to reflect the target instruction.

11. The apparatus of claim 7, wherein cancelling the restore for the entry of the history buffer further comprises clearing a restore pending flag in the entry of the history buffer.

12. The apparatus of claim 7, wherein cancelling the flush for the entry of the general purpose register further comprises clearing a flush pending flag in the entry of the general purpose register.

* * * * *